United States Patent Office 3,242,255
Patented Mar. 22, 1966

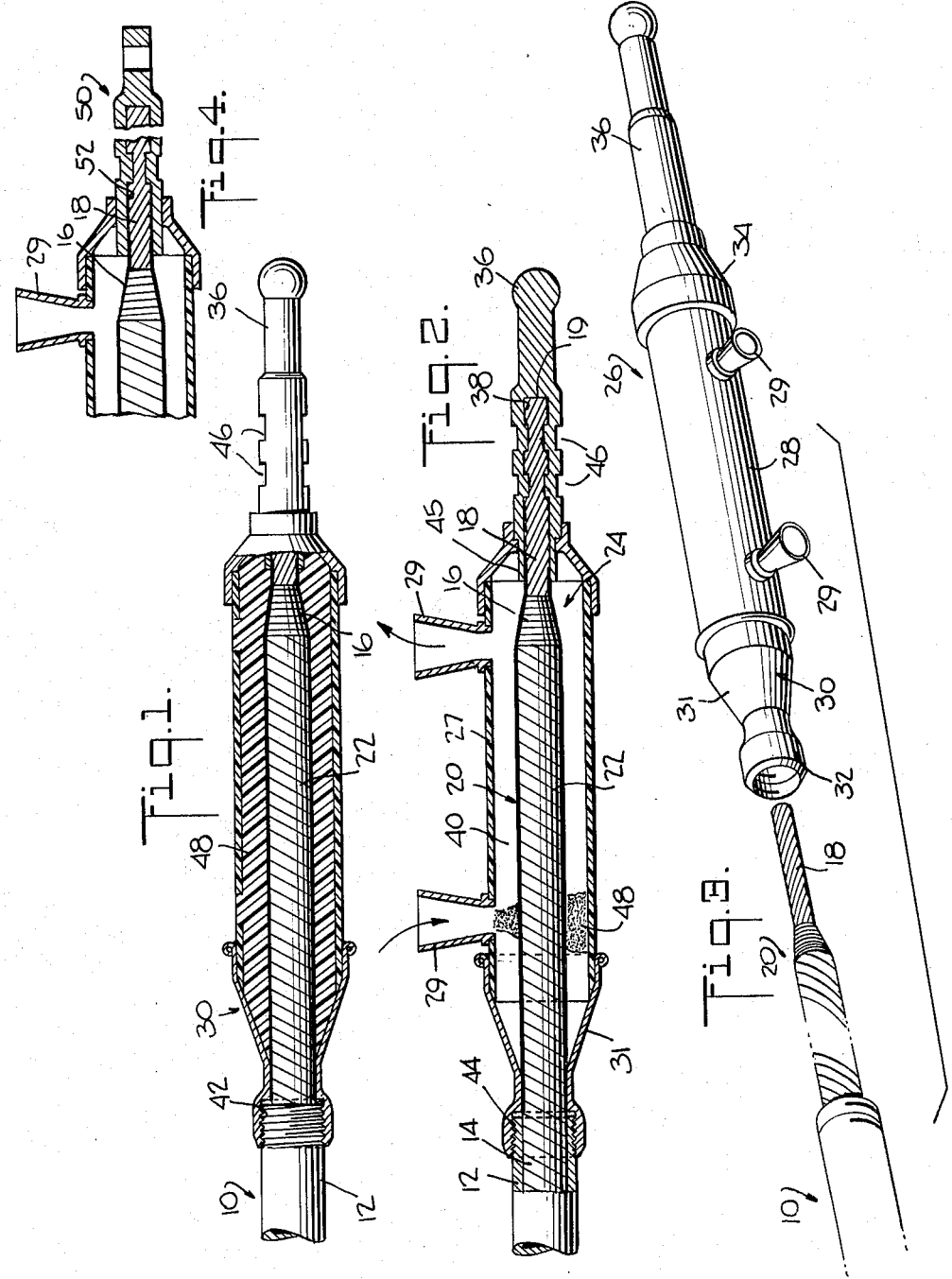

3,242,255
CABLE TERMINAL ASSEMBLY
Louis F. Falkenstein, Levittown, Pa., and Zoltan B. Dienes, St. Paul, Minn., assignors to Consolidated Edison Company of New York, Inc., New York, N.Y., a corporation of New York
Filed Feb. 3, 1964, Ser. No. 342,191
1 Claim. (Cl. 174—73)

The present invention relates to electrical cable construction and, more particularly, to improvements in an electric power cable termination assembly.

Transformers generally used in electrical power distribution systems may be filled with oil or other suitable circulating liquid. No matter what type of transformer is employed, however, the connection of the electrical power cable thereto must be protected. This protection is necessary since the terminal portion of the cable is exposed or stripped of its protective wrapping to make the cable connection. This exposed portion of the cable must be protected against the entry of oil or other contaminating material thereinto and the loss of cable insulating oil which could contaminate the transformer insulating circulating fluid.

Heretofore, in making a connection of an electrical power cable to apparatus such as transformers, generally the technique employed comprises stripping the insulation from the cable end, soldering a lug onto the terminal end of the exposed cable strands, and then oil-sealing the exposed portion of the cable to permit insertion thereof into the accommodating transformer receptacle. Since oil has very high penetrating characteristics, if the cable end is oil-sealed, it will likewise be sealed against penetration by moisture and other less-penetrating liquids. In like manner, the transformer is protected from contamination by cable oil or other moisture due to a defect in the cable sheath. The oil-sealing is accomplished by tightly wrapping the exposed cable portion with silk tape, and painting the tape with an oil-impervious coating, such as glyptal lacquer. Next, to relieve high electrical field stress, the wrapped cable had formed thereon a conical bumper of silk tape and glyptal lacquer over which was applied a stress cone of copper mesh. The entire cable end, including the bumper and stress cone, and extending up to the cable lug, was then oil-proofed by means of the silk tape and glyptal lacquer to form the finished cable terminal assembly.

It will be at once evident that this technique was tedious and time-consuming. Further, great care had to be taken to achieve a proper cable terminal assembly. For example, care had to be taken not to twist or wrinkle the tape. Likewise, it was necessary to be sure that the lacquer brush was always well saturated to ensure a heavy coat of glyptal. Further, it was imperative that steps be taken to avoid damaging the dried coats of lacquer. In addition, extreme care had to be exercised to wrap the tapes about the exposed area to avoid wrinkling and other defects. And at least ten minutes had to be allowed between successive lacquer coats to permit proper drying thereof. To compensate for this long delay, usually two cables were preferably made simultaneously, with work on one proceeding during the drying time of the other cable.

In general, to achieve a properly oil-proofed cable terminal by the foregoing technique, extreme care and patience was required. Inevitably, great difficulty has been experienced in achieving consistently good results.

The cable terminal assembly of the present invention, however, virtually eliminates the uncertainties of the prior techniques and makes possible consistently good cable terminal assemblies while substantially reducing the time required for field assembly. The present invention is briefly characterized by the utilization of a preformed nonmetallic sleeve secured in place around the exposed portion of the cable from which the conventional lead sheath has been removed. The sleeve is secured at one end, as by threading, to the cable lead sheath, while its other end is fitted to a cable terminal lug which has been crimped onto the cable end strands. To provide the necessary field stress relief, the sleeve is preformed with a stress cone. The oil-sealed assembly is completed by filling the space between the sleeve and the cable with a self-curing resin. Thus, the cable terminal assembly of the present invention can be readily made up in the field with a minimum of labor, and requires no special taping or assembly skills.

Further objects and advantages of the invention will be obvious herefrom or may be learned by practice with the invention, the same being realized and attained by means of the instrumentalities and combinations pointed out in the appended claim.

The foregoing general description and the following detailed description are exemplary and explanatory, but are not restrictive of the invention.

Of the drawings illustrating by way of example embodiments of the invention, and wherein like numerals designate like parts:

FIG. 1 is a plan view, partly in section, of a finished cable terminal assembly in accordance with the present invention;

FIG. 2 is a longitudinal sectional view of the cable assembly of FIG. 1, prior to the final sealing operation; and FIG. 3 is an exploded view of the cable and terminal at the start of the cable terminal assembly operation;

FIG. 4 is a detailed view of a modified form of the cable terminal assembly of the present invention.

Referring to the drawings, the electrical power cable with which the present invention is concerned is designated generally as 10, and for illustrative purposes is shown as a conventional single conductor high-voltage (15 kv.) type, having an outer lead sheath 12, a conductive tape layer 14 beneath the sheath 12, and layers of paper insulating material 16 between the tape 14 and the cable strands 18. However, other forms of cable may be used with equal facility with the invention.

In accordance with the invention, the terminal end 20 of cable 10 is prepared by removing the lead sheath 12 therefrom. We have found that removal of about eleven to twelve inches of sheath will suffice in typical cases of a 15 kv. line to line arrangement. However, this will change with the applicable voltage and application.

Next, the conductive tape layer 14 is also removed and replaced by a wrapping of high strength, non-conductive tape 22, such as, Mylar. The final step in preparing the cable 10 is to taper or pencil the end 24 of the paper insulation layers 16 and apply a wrapping of tape 22 thereto also.

The terminal assembly, designated generally 26, of the invention comprises a hollow, generally cylindrical sleeve or body portion 28 formed preferably of a suitable insulating material and having a pair of axially spaced funnels 29 communicating with the interior of sleeve 28 for reasons described in detail hereinbelow. Attached at one end to body 28 is a first hollow, conical metallic end cap 30, which is formed with, or otherwise provided with, a ferrule member 32. The other end of body 28 is provided with a second hollow conical non-metallic end cap 34, to which is attached an elongated terminal pin 36 adapted to be engaged by the accommodating transformer receptacle (not shown). Pin 36, in turn, has an elongated cavity 38 in the end thereof adjacent element 34 with the cavity 38 thus in communication with the interior chamber 40 of terminal assembly 26.

To assemble the cable terminal, lead sheath 12 is threaded as at 42 and the threads 42 provided with a suitable adhesive agent 44, such as, an activated epoxy resin. The terminal portion 20 of the cable 10 previously prepared as described hereinabove is inserted through ferrule 32 into the interior of terminal assembly 26. The cable strands 18 are also provided with an annular zone 45 of adhesive agent and are directed into cavity 38 of pin 36 and the assembly 26 is rotated to thread the ferrule 32 onto the threaded portion 42 of cable 10 until the ends 19 of the strands 18 reach their limit of advance into cavity 38. In the event ferrule 32 does not readily thread itself sufficiently onto lead sheath 12, the outer diameter may be increased as by soldering a few turns of copper mesh (not shown) thereon at the area of engagement with ferrule 32.

To ensure proper electrical connection between the current-carrying strands 18 and the terminal pin 36, a pair of spaced crimps 46 are made in the pin 36 (see FIGS. 1 and 2).

To complete the oil-impervious terminal assembly of the present invention, the terminal assembly is preferably oriented as shown in FIG. 2, and the unoccupied area in chamber 40 is filled through one of the funnels 29 with a self-curing resin material 48, while the other funnel 29 acts as a vent to prevent escape of air from chamber 40 during filling thereof with resin 48. We have found, for example, that epoxy resin materials or a material commercially available under the trade name "Scotchcast #4" are suitable for this purpose in 15 kv. line to line applications.

When resin 48 has hardened or cured, the terminal assembly is completed by removing funnels 29 and smoothly finishing the outer periphery 27 of sleeve 28 adjacent the funnel areas as well as the sharp edges on crimps 46.

In use, the conical portion 31 of end cap 30 functions as a stress relief member to relieve the high electrical field stress to which cable 10 is subjected. This novel stress relief member 30 is also provided with the threaded element 32 for securing the terminal assembly 26 in place, and likewise functions as the end portion thereof for containing the resin material 48.

The present invention can be utilized with equal facility as a cable termination for overhead or pole-type applications. In this connection, terminal or bayonet pin 36 is replaced by a lug member 50. In assembly, the terminal end of cable 10 is prepared as heretofore described for the first embodiment. Lug 50, suitably attached to cap 34 and having an internal cavity 52 for accommodating strands 18 of cable 10, is applied to the free end of cable 10 as shown in FIG. 4, and suitably secured thereto as by crimping or by a suitable connecting agent.

The cable terminal assembly is then completed in like manner to the first-described embodiment to produce a cable termination adapted for use in overhead or pole-type applications.

Thus, there is disclosed a novel, yet simple and highly efficient, cable terminal assembly which can be readily applied in the field with a minimum of labor and field rejections, but which still provides the proper protection and stress relief for the cable terminal.

Although certain particular embodiments of the invention are herein disclosed for purposes of explanation, further modifications thereof, after study of the specification, will be apparent to those skilled in the art to which the invention pertains. Reference should accordingly be had to the appended claim in determining the scope of the invention.

What is claimed and desired to be secured by Letters Patent is:

A terminal assembly for sheathed cables, comprising an elongated housing for the terminal end portions of said cable, a conical stress relief member joined to said elongated housing forming a closure for one end of said housing and surrounding said cable in said housing, threaded means on said conical stress relief member securing said housing to the unexposed portion of said cable adjacent the terminal end of said cable, a terminal element at the other end of said housing remote from said conical stress relief member and having a recess formed therein receiving the current-carrying portion of said cable disposed in said housing, means effecting electrical interconnection between said element and said current-carrying portion of said cable, and a hardened insulating medium filling said housing sealing therein the cable portions in said housing.

References Cited by the Examiner

UNITED STATES PATENTS

| | | | |
|---|---|---|---|
| 2,312,652 | 3/1943 | Komives et al. | 174—88 X |
| 2,827,508 | 3/1958 | Roehmann | 174—73 |
| 2,873,482 | 2/1959 | Bridge et al. | 174—179 X |
| 3,187,088 | 6/1965 | Warner | 174—76 X |

FOREIGN PATENTS

| | | |
|---|---|---|
| 1,065,909 | 9/1959 | Germany. |
| 99,812 | 2/1962 | Norway. |

JOHN F. BURNS, *Primary Examiner.*